US010062243B2

(12) United States Patent
Iizuka

(10) Patent No.: US 10,062,243 B2
(45) Date of Patent: Aug. 28, 2018

(54) INFORMATION PROCESSING APPARATUS AND PROGRAM

(71) Applicant: TOSHIBA TEC KABUSHIKI KAISHA, Shinagawa-ku, Tokyo (JP)

(72) Inventor: Junko Iizuka, Kawasaki Kanagawa (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/459,072

(22) Filed: Mar. 15, 2017

(65) Prior Publication Data
US 2017/0301191 A1 Oct. 19, 2017

(30) Foreign Application Priority Data
Apr. 15, 2016 (JP) ................. 2016-082346

(51) Int. Cl.
*G06K 15/00* (2006.01)
*G07G 1/00* (2006.01)
*G06K 19/06* (2006.01)
*G06Q 20/20* (2012.01)
*G06Q 20/18* (2012.01)

(52) U.S. Cl.
CPC ..... *G07G 1/0072* (2013.01); *G06K 19/06028* (2013.01); *G06Q 20/18* (2013.01); *G06Q 20/208* (2013.01)

(58) Field of Classification Search
CPC ....... G07G 1/0054; G06Q 30/06; G06Q 20/20

USPC .......................................... 235/383
See application file for complete search history.

(56) References Cited

U.S. PATENT DOCUMENTS

| 7,575,162 B1* | 8/2009 | Malchak ................. A47F 9/047 235/375 |
| 2012/0054051 A1 | 3/2012 | Hirono |
| 2014/0175164 A1* | 6/2014 | Allard .................... G06Q 30/06 235/375 |

* cited by examiner

*Primary Examiner* — Ahshik Kim
(74) *Attorney, Agent, or Firm* — Amin, Turocy & Watson LLP

(57) ABSTRACT

According to one embodiment, an information processing apparatus includes input unit that inputs commodity information indicating a commodity to be registered, setting unit that sets the number of pieces of the commodity, measurement unit that measures weight of the number of pieces of the commodity, first determination unit that determines whether or not a difference between the measured weight and a multiplication value obtained by multiplying a representative value of weight which is set in advance for the commodity by the number is within a range of a preset predicted width, registration unit that registers the commodity indicated by the commodity information in association with the number, second determination unit that determines a threshold range to which the difference corresponds, based on a preset threshold range of a plurality of stages, and notification unit that makes a different notification for each of the threshold ranges.

19 Claims, 6 Drawing Sheets

*FIG. 6*

| COMMODITY CODE | COMMODITY NAME | UNIT PRICE (YEN) | REPRESENTATIVE VALUE (g) |
|---|---|---|---|
| 49000000000016 | xxxx | 100 | 120 |
| 49000000000017 | yyyy | 200 | 150 |
| ⋮ | ⋮ | ⋮ | ⋮ |

INFORMATION PROCESSING APPARATUS AND PROGRAM

CROSS-REFERENCE TO RELATED APPLICATION

This application is based upon and claims the benefit of priority from Japanese Patent Application No. 2016-82346, filed Apr. 15, 2016, the entire contents of which are incorporated herein by reference.

FIELD

Embodiments described herein relate generally to an information processing apparatus and a program.

BACKGROUND

In the related art, there is a self-checkout terminal in which a customer performs a registration work and an accounting work of a commodity. Such a self-checkout terminal is equipped with a function of reading a barcode or the like by using a scanner and checking weight by using a scale device, in order to prevent fraudulent acts or the like of the customer. In the related art, a technique has been proposed in which weight data of a commodity is acquired from a PLU file based on a commodity code read from a barcode, and registration is performed if the weight data matches the actually measured weight of the commodity.

Meanwhile, among commodities sold at stores such as supermarkets, there are commodities that vary in weight, such as fruits and vegetables. However, in the above-described related art, since weight is checked based on the identity of weight, there is a possibility that it is not possible to appropriately check a commodity having a variation in weight. Moreover, in the related art, since a uniform notification is made regardless of actual conditions if the weights of the commodity do not match, it is inconvenient for customers and it needs to improve prevention of fraudulent acts and operation support.

DESCRIPTION OF THE DRAWINGS

FIG. 6 is a diagram schematically illustrating an example of a data configuration of a commodity master file.

DETAILED DESCRIPTION

An object of an exemplary embodiment is to provide an information processing apparatus and a program capable of more appropriately checking weight of a commodity having a variation in weight and improving convenience in notification.

In general, according to one embodiment, an information processing apparatus includes input means, setting means, measurement means, first determination means, registration means, second determination means, and notification means. The input means inputs commodity information indicating a commodity to be registered. The setting means sets the number of pieces of the commodity indicated by the commodity information. The measurement means measures the weight of the number of pieces of the commodity indicated by the commodity information. The first determination means determines whether or not a difference between the measured weight and a multiplication value obtained by multiplying a representative value of weight which is set in advance for the commodity indicated by the commodity information by the number is within a range of a preset prediction width. The registration means registers the commodity indicated by the commodity information in association with the number, on condition that the first determination means determines that the difference is within the range of the predicted width. The second determination means determines a threshold range to which the difference corresponds, based on a preset threshold range of a plurality of stages, on condition that the first determination means determines that the difference is out of the range of the predicted width. The notification means makes a different notification for each of the threshold ranges, based on a determination result of the second determination means.

Embodiment

Figure 1:
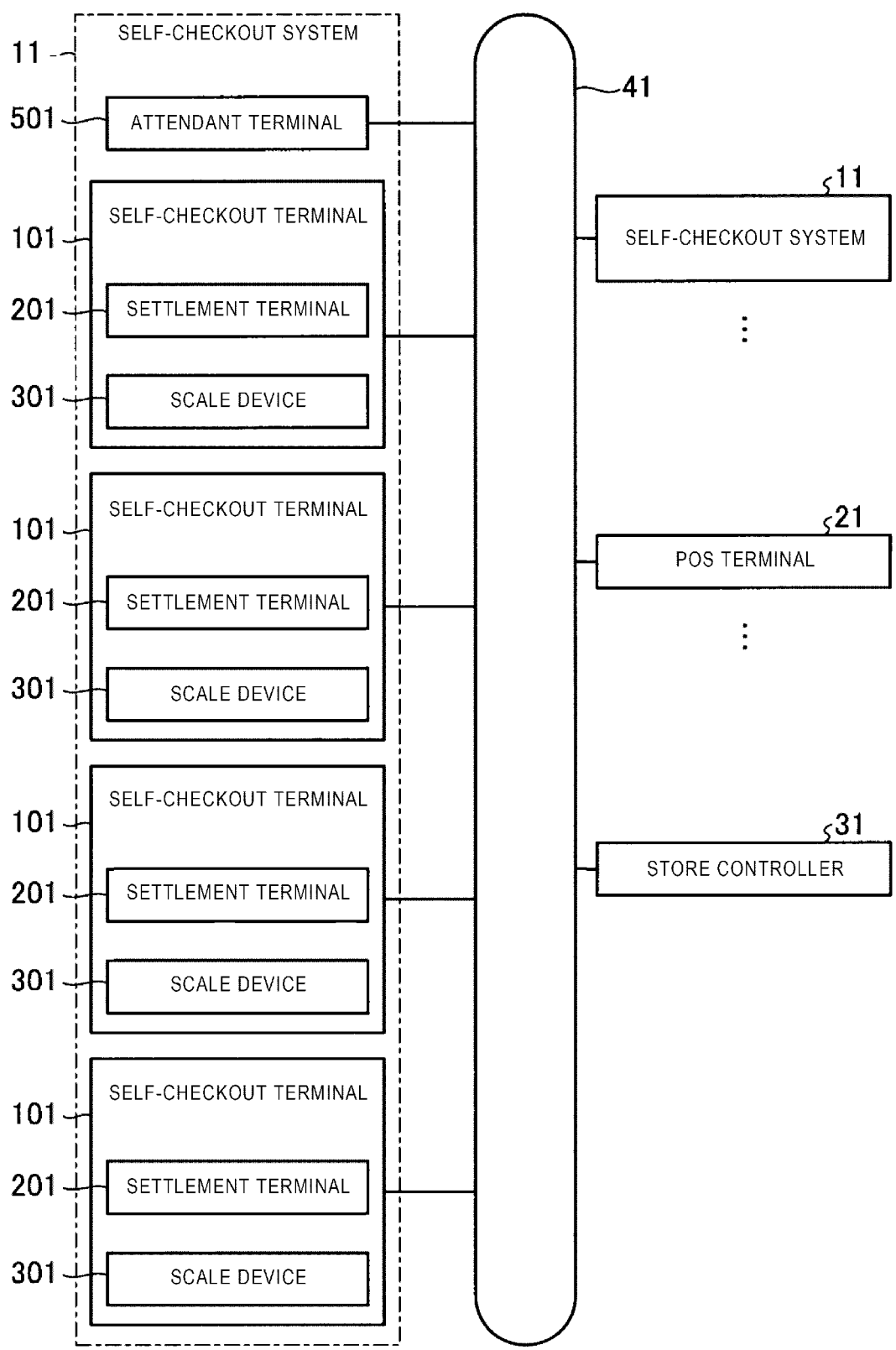
FIG. 1 is a diagram schematically illustrating a configuration of a system.

FIG. 1 is a diagram schematically illustrating a configuration of a system according to a present embodiment. The system of the embodiment includes a plurality of self-checkout systems 11, a plurality of Point Of Sales (POS) terminals 21, and a store controller 31, which are coupled through a communication network 41. The self-checkout system 11 is configured such that one attendant terminal 501 is allocated to a plurality of self-checkout terminals 101. The self-checkout terminal 101 is a terminal used for a customer to perform a registration work and an accounting work of commodity. The attendant terminal 501 is a terminal operated by a clerk who monitors the state of the self-checkout terminal 101.

Figure 2:
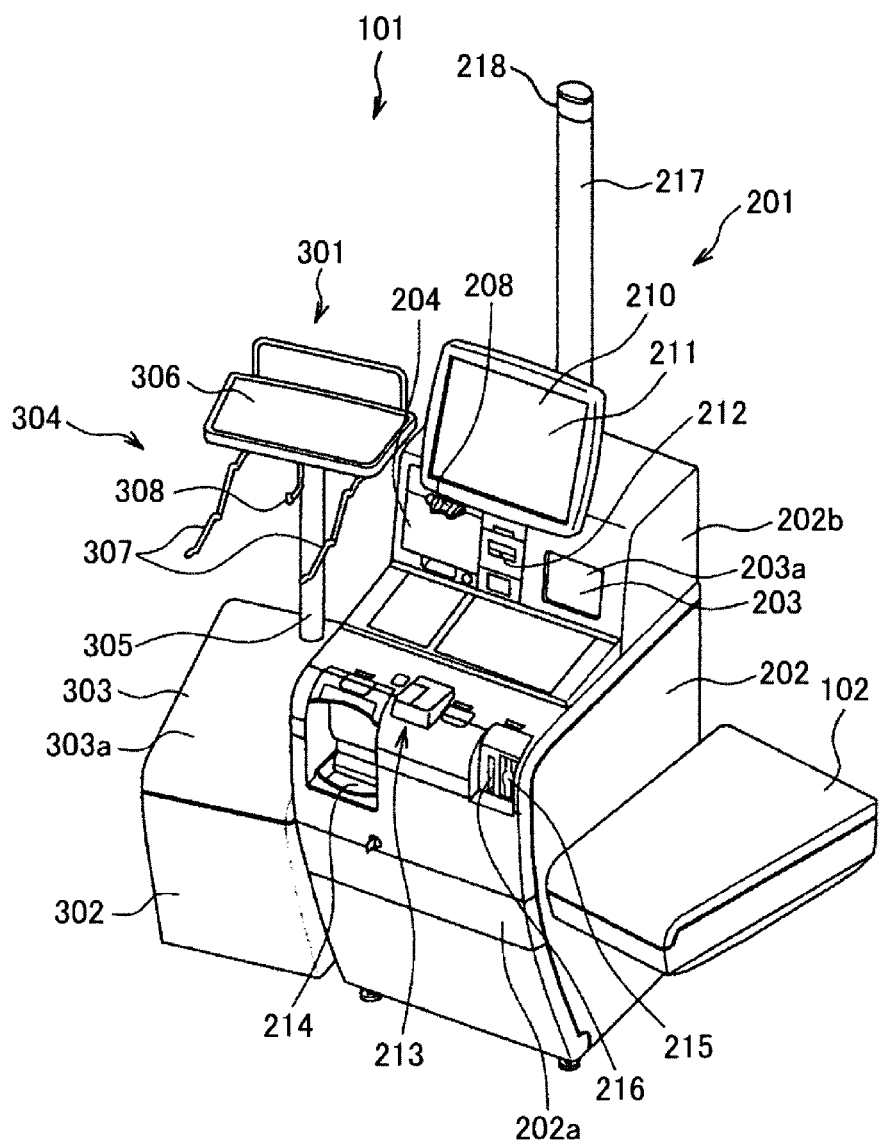
FIG. 2 is a perspective view illustrating a self-checkout terminal.

FIG. 2 is a perspective view illustrating the self-checkout terminal 101. The self-checkout terminal 101 includes a settlement terminal 201 and a scale device 301.

The settlement terminal 201 includes a housing 202 from the side of which a commodity basket placing table 102 for placing a basket (not shown) containing commodity to be registered protrudes.

The housing 202 of the settlement terminal 201 includes abase housing 202a installed on the floor surface, and an upper housing 202b placed on the upper surface of the base housing 202a. The front surface of the base housing 202a is inclined so as to narrow the projected area of the base housing 202a as it goes downward. Thus, the base housing 202a has a shape that is offset to the back side as it goes downward.

In the upper housing 202b, a barcode scanner 203 is disposed on the side of the commodity basket placing table 102, and a printer cover 204 is disposed on the opposite side of the commodity basket placing table 102. A card insertion slot 212 is disposed between the barcode scanner 203 and the printer cover 204.

The barcode scanner 203 is a vertical scanner including a reading surface 203a made of a glass plate and irradiating a laser beam pattern of a predetermined pattern onto a reading space located in front of the reading surface 203a. When an article is positioned in the reading space and the barcode attached to the article is directed to the reading surface 203a, the barcode scanner 203 receives reflected light from the barcode by a light receiving element (not shown). The barcode scanner 203 decodes the received light signal of the barcode based on the output signal of the light receiving element and acquires commodity information such as a commodity name and a commodity code indicated by the barcode as code data. Then, the barcode scanner 203 inputs the acquired code data to a control unit 253 (see FIG. 5) of the settlement terminal 201.

The printer cover 204 is provided with a receipt issue opening 208. A receipt printer 251 (see FIG. 5) is built in the backside of the printer cover 204. A receipt (not shown) printed by the receipt printer 251 is configured to be issued from the receipt issue opening 208. The printer cover 204 is attached to the upper housing 202b so as to be freely opened and closed.

A card reader and writer 252 (see FIG. 5) is built in the card insertion slot 212. The card reader and writer 252 is a magnetic card reader and writer capable of reading and writing data from and to a magnetic card such as a credit card.

A liquid crystal display (LCD) 210 which is a display unit for displaying commodity information such as the commodity name, price, and image of the registered commodity to shoppers is attached to the upper housing 202b. A touch panel 211 is stacked on the screen of the LCD 210. On the touch panel 211, various operators are disposed on the screen of the LCD 210.

Figure 3:
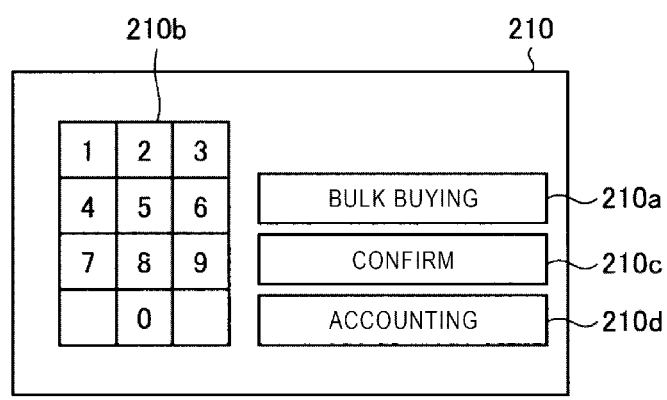
FIG. 3 is a diagram illustrating an example of an operator disposed on a screen of an LCD.

FIG. 3 is a diagram illustrating an example of an operator disposed on a screen of the LCD 210. As illustrated in FIG. 3, a bulk buying button 210a, a ten key 210b, a confirm button 210c, an accounting button 210d, and the like are disposed on the screen of the LCD 210. The bulk buying button 210a is an operator for requesting input of the number of the same commodity when purchasing a plurality of number of pieces for the same commodity. The ten key 210b is an operator for inputting commodity information and the number of pieces of the commodity. The confirm button 210c is an operator for instructing confirmation of the operation. The accounting button 210d is an operator for requesting accounting of a commodity.

Returning to FIG. 2, a deposit and withdrawal device 221 (see FIG. 5) for coins and bills is built in the base housing 202a. As a part of the deposit and withdrawal device 221, a coin slot 213 is disposed on the center upper surface of the base housing 202a, and a coin payout opening 214 is disposed on the left side of the coin slot 213. Further, a bill insertion slot 215 and a bill payout opening 216 are disposed on the right side of the coin slot 213. The deposit and withdrawal device 221 includes a mechanism portion that enables handling of coins and bills and a control unit that controls the mechanism portion (neither shown). Since the structure of the mechanism portion, the processing procedure at the control unit, and the like are well known, the explanation thereof is omitted.

Further, a display pole 217 which is an alarm device for indicating the current state of the self-checkout terminal 101 is erected from the back surface of the base housing 202a. The display pole 217 includes a light emitting unit 218 that selectively emits blue light and red light at the distal end portion.

Figure 4:
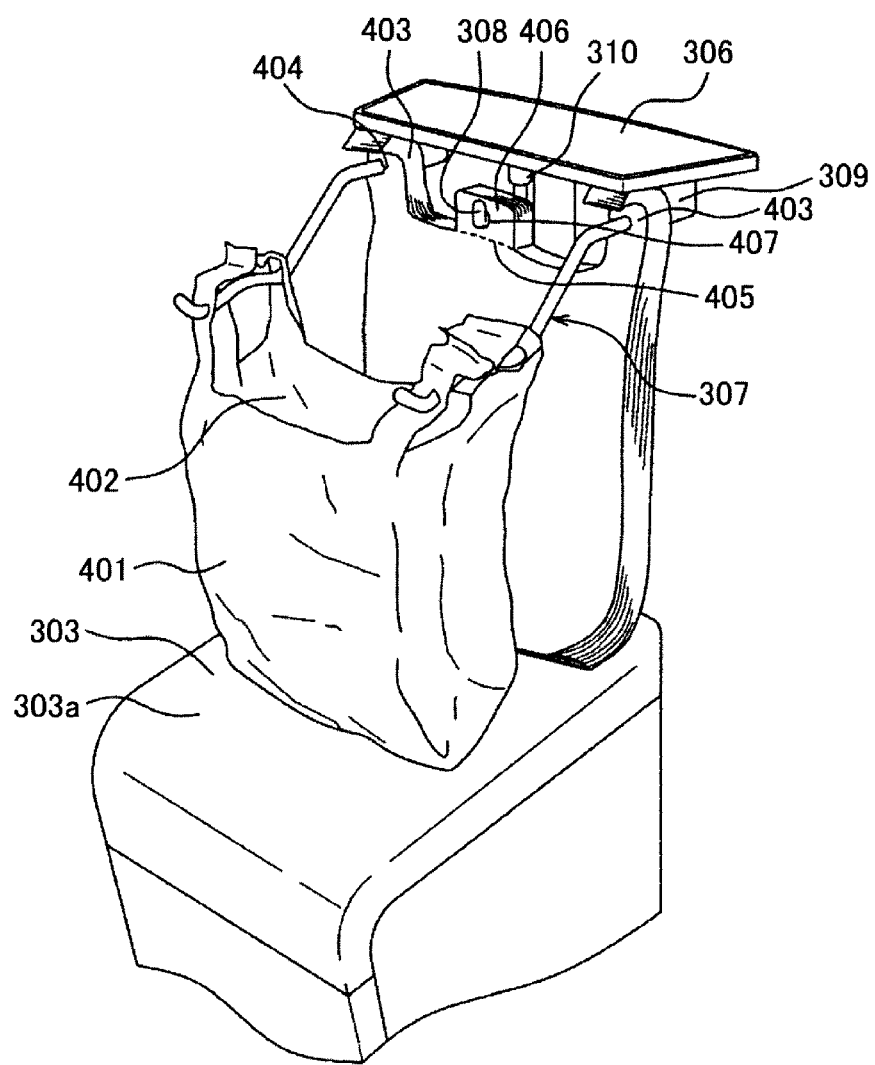
FIG. 4 is a perspective view illustrating a state where a plastic bag is held by a holding arm of a scale device.

Next, the scale device 301 will be described with reference to FIG. 2 and FIG. 4. FIG. 4 is a perspective view illustrating a state where a plastic bag is held by a holding arm of the scale device 301. The scale device 301 includes a scale housing 302. A scale dish 303 is provided at the top of the scale housing 302. A bag holder 304 for holding a plastic bag 401, which is a storage member storing a commodity of which commodity information is input, is attached to the scale dish 303. The scale device 301 measures the weight of the commodities which are stored in the plastic bag 401 and placed on the scale dish 303. The scale dish 303 has a mounting table 303a on its upper surface. The bag holder 304 is attached to the mounting table 303a. Therefore, with respect to bag holder 304, the scale dish 303 constitutes a pedestal. In other words, a pole-shaped arm supporting portion 305 is erected at the rear center portion of the mounting table 303a, and a temporary placing stand 306 for placing items is fixed to the upper end of the arm supporting portion 305. The temporary placing stand 306 has a flat upper surface and is a table used for temporarily placing the commodity after scanning the code symbol with the barcode scanner 203 of the settlement terminal 201. The mounting table 303a and the temporary placing stand 306 have a function as a placing portion for placing the commodity for which the commodity code is input.

A pair of holding arms 307 and hooks 308 are attached to the lower surface of the temporary placing stand 306. In other words, an arm attachment 309 (see FIG. 4) is fixed at both end positions of the lower surface of the temporary placing stand 306. The fixing is performed by various fixing methods such as screw fixing, adhesive fixing, or the like. The holding arm 307 is embedded in each of the arm attachments 309. Further, a hook attachment 310 (see FIG. 4) is fixed in the center position of the lower surface of the temporary placing stand 306. The fixing is performed by various fixing methods such as screw fixing, adhesive fixing, or the like. The hook 308 is embedded in the hook attachment 310.

The holding arm 307 holds the plastic bag 401. The plastic bag 401 has an opening portion 402 and a pair of grips 403 projecting from the opening portion 402, and these grips 403 are folded so as to be positioned on both sides of the holding arm 307. The holding arm 307 holds a pair of grips 403 of the plastic bag 401 in a skewered state. In order to realize such a holding state, a slit 404 is formed in the grips 403. In the plastic bag 401, a pair of ears 406 which are positioned between the pair of grips 403 and detachable by a perforation 405 are formed, and a hook hole 407 is formed in the these ears 406. The hook 308 passes through the hook hole 407, thereby holding the plastic bag 401 and the holding arm 307.

Figure 5:
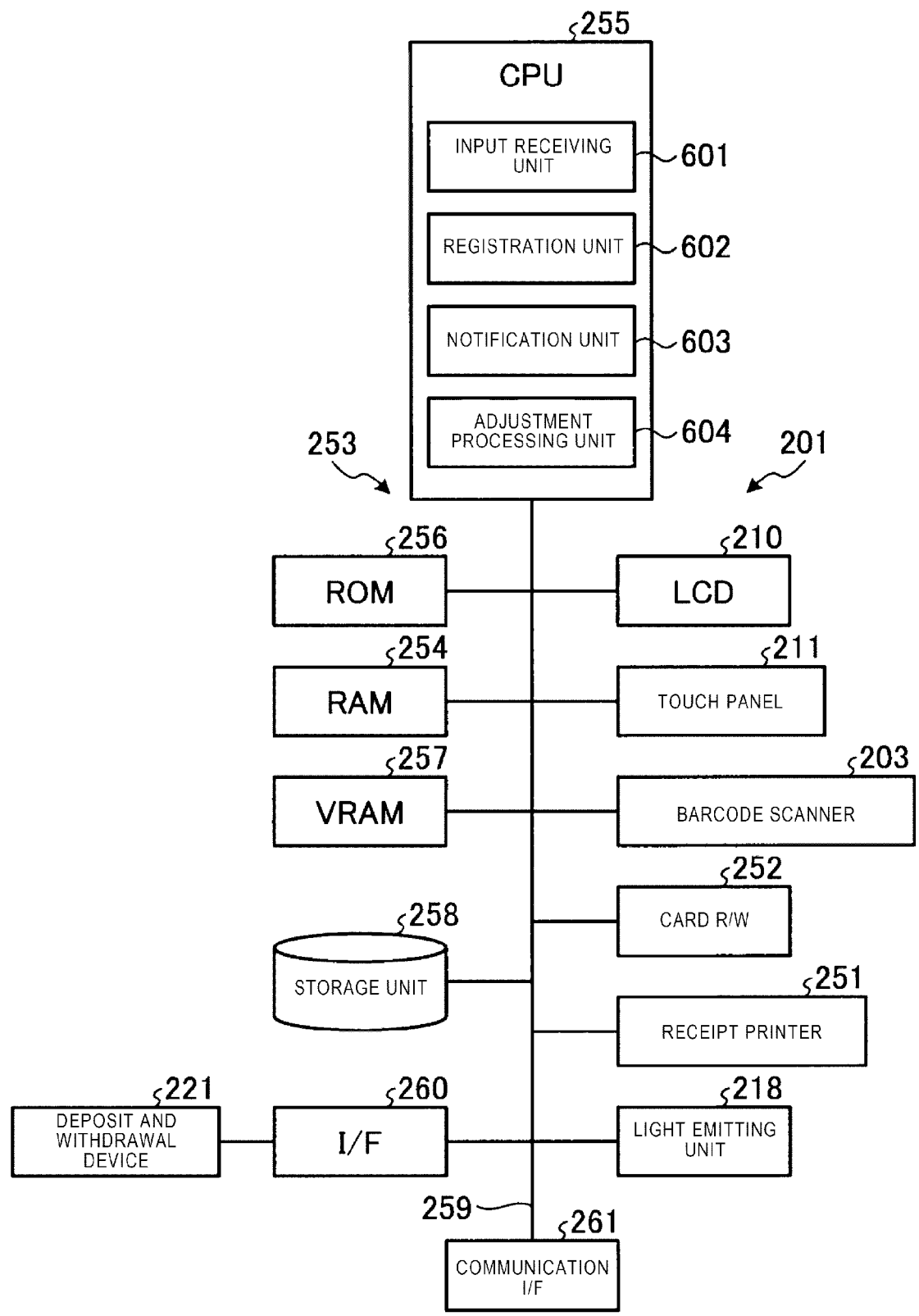
FIG. 5 is a block diagram illustrating an electrical hardware configuration of a settlement terminal.

FIG. 5 is a block diagram illustrating an electrical hardware configuration of the settlement terminal 201. The settlement terminal 201 includes the control unit 253 which is an information processing unit therein. For example, the control unit 253 may have a semiconductor chip configuration in which an operation sequence is written, or a microcomputer configuration that operates according to a program. Here, the control unit 253 of a microcomputer configuration will be explained.

The central part of the control unit 253 is a central processing unit (CPU) 255. A random access memory (RAM) 254, a read only memory (ROM) 256, a video random access memory (VRAM) 257, and a storage unit 258 are connected to the CPU 255 through a system bus 259.

Further, the barcode scanner 203, the LCD 210, the touch panel 211, the card reader and writer 252, the receipt printer 251 and the light emitting unit 218 are connected to the control unit 253 through the system bus 259.

Further, an interface 260 and a communication interface 261 are connected to the control unit 253, through the system bus 259. The interface 260 realizes data communication with the deposit and withdrawal device 221. The communication interface 261 is connected to the communication network 41 and realizes data communication between the attendant terminal 501, the store controller 31, and the self-checkout terminal 101. Although not shown, an interface for realizing data communication with the scale device 301 through the system bus 259 is also connected to the control unit 253.

The storage unit 258 is a storage device such as a flash memory, a solid state drive (SSD), a hard disk drive (HDD), or the like. The storage unit 258 stores various programs executed by the control unit 253 (CPU 255) and various setting information. The storage unit 258 also stores a commodity master file T, a sales file for storing sales data, and the like.

FIG. 6 is a diagram schematically illustrating an example of a data configuration of the commodity master file T. The commodity master file T stores the commodity name, unit price, representative value of weight, and the like of the commodity in association with the commodity code of each commodity. Here, examples of the representative value include an average value, a median value, and a mode of the weight measured in advance for the same commodity group. In this way, even if a commodity has a variation in weight, it is possible to set the reference weight of the commodity as a representative value, by using any one of the average value, the median value and the mode of the weight. The number of pieces of the commodity used for calculating the representative value is not particularly limited.

Next, functions of the settlement terminal 201 will be described. The CPU 255 realizes various functions by operating according to the program which is stored in the storage unit 258 and loaded in the RAM 254. Specifically, as illustrated in FIG. 5, the CPU 255 functions as an input receiving unit 601, a registration unit 602, a notification unit 603 and an adjustment processing unit 604.

The input receiving unit 601 is a functional unit that receives an operation input through the touch panel 211. For example, after the bulk buying button 210a is operated, the input receiving unit 601 receives a numerical value from the numeric keypad 210b, and if the confirm button 210c is operated, the input receiving unit 601 accepts the numerical value input from the ten key 210b as the number of pieces of the commodity. In addition, if a numerical value is input from the ten key 210b and the confirm button 210c is operated, the input receiving unit 601 accepts the numerical value input from the ten key 210b as commodity information. In addition, the input receiving unit 601 accepts an accounting request of the commodity by the accounting button 210d.

The registration unit 602 is a functional unit that performs a registration process of the commodity indicated by the commodity information input from the barcode scanner 203. Specifically, the registration unit 602 stores the commodity information input from the barcode scanner 203 in a predetermined area of the RAM 254 in association with the number of pieces of the commodity indicated by the commodity information to register the commodity.

The registration unit 602 also executes a weight determination process (weight check) to prevent fraudulent acts of customers when registering a commodity. More specifically, when the commodity information is input from the barcode scanner 203, the registration unit 602 reads the representative value associated with the commodity code indicated by the commodity information from the commodity master file T. Next, the registration unit 602 multiplies the read representative value by the number of pieces of the commodity to calculate the weight of the number of pieces of the commodity (hereinafter referred to as reference weight). Next, when the commodity corresponding to the entered commodity information is placed in the scale dish 303, the registration unit 602 receives the weight measured by the scale device 301 (hereinafter referred to as actually measured weight). Next, the registration unit 602 calculates a difference between the reference weight and the actually measured weight as a weight difference, and executes a weight determination process for determining whether or not the weight difference is within the range of the predicted width. The registration unit 602 also counts the number of times of the weight determination process executed for the same commodity.

Here, the predicted width is defined as a range of a weight difference which is considered to be appropriate. An arbitrary value can be set as the predicted width. Further, the predicted width can be set in an arbitrary form. For example, the predicted width may be set at a ratio such as a percentage. In this case, if the absolute value of the weight difference is not more than the multiplication value obtained by multiplying the verification weight by the predicted width (for example, 5%), the registration unit 602 determines that the weight difference is within the range of the predicted width. Further, with respect to the predicted width, the weight corresponding to the predicted width may directly be set. In this case, if the absolute value of the weight difference is not more than the predicted width (for example, 10 g), the registration unit 602 determines that the weight difference is within the range of the predicted width. The predicted width may be set uniformly for all commodities or may be set for each commodity. In the latter case, the predicted width may be registered in the commodity master file T in association with the commodity code of a target commodity.

The registration unit 602 stores commodity information and the number of pieces of the commodity in a predetermined area of the RAM 254 in association with each other to register the commodity, on condition that the weight difference is determined to be within the range of the predicted width. In addition, the registration unit 602 cooperates with the notification unit 603 on condition that the weight difference is determined to be out of the range of the predicted width, thereby making a notification according to the magnitude of the weight difference and the number of times of the weight determination process.

The notification unit 603 is a functional unit that makes various notifications using the LCD 210, the light emitting unit 218, the communication interface 261, or the like. Note that the notification unit 603 may make a sound notification by operating a sound output device such as a speaker not illustrated in the drawing.

For example, the notification unit 603 displays on the LCD 210, the commodity name of the commodity indicated by the commodity information input from the barcode scanner 203 on condition that the commodity has been registered. Thus, the customer can confirm the registration of the commodity by viewing the commodity name displayed on the LCD 210.

On condition that the bulk buying button 210a is operated, the notification unit 603 displays on the LCD 210, a message notifying that the number of pieces of the commodity indicated by the commodity information input from the barcode scanner 203 can be input. Thus, the customer can recognize that it is possible to input the number by viewing the message displayed on the LCD 210.

Furthermore, on condition that the weight difference is determined to be out of the range of the predicted width by the registration unit 602, the notification unit 603 makes a notification according to the magnitude of the weight difference. More specifically, the notification unit 603 determines the degree of the weight difference based on a preset threshold or the like, and changes the notification content and the notification method according to the degree.

As an example, it is assumed that thresholds of two levels (first threshold<second threshold) are set for the magnitude of the weight difference. In this case, the notification unit 603 determines a level to which the magnitude of the weight difference corresponds out of a level less than the first threshold value (low level), a level not less than the first threshold value and less than the second threshold value (middle level), and a level not less than the second threshold value (high level), and makes a notification according to the corresponding level. For example, in the low level, the notification unit 603 notifies a message prompting to re-enter the number of pieces of the commodity by display or voice. In addition, in the middle level, the notification unit 603 notifies a message prompting confirmation of the number of pieces of the commodity placed on the scale dish 303 by display or voice. In addition, in the high level, the notification unit 603 notifies any one of the above-described messages by display or voice, and makes a notification to the attendant terminal 501. Here, the notification to the attendant terminal 501 may be performed by causing the light emitting unit 218 to emit light, or by transmitting a predetermined signal to the attendant terminal 501 through the communication interface 261. In addition, the message to be notified preferably has a content for more directly pointing out that the greater the weight difference, the higher the possibility that the number of pieces of the commodity placed on the scale dish 303 is different from the input number of pieces of the commodity.

Furthermore, on condition that the weight difference is determined to be out of the range of the predicted width by the registration unit 602, the notification unit 603 makes a notification according to the number of times of the weight determination processes counted by the registration unit 602. More specifically, the notification unit 603 changes notification contents and a notification method according to the number of times of the weight determination process. For example, if the number of times of the weight determination process is one time, the notification unit 603 may perform a notification by display or voice. Further, if the number of times of the weight determination process is two times or more, the notification unit 603 may perform a notification by display or voice, and may make a notification to the attendant terminal 501. In addition, the message to be notified preferably has a content for more directly pointing out that the more the number of times of the weight determination process, the higher the possibility that the number of pieces of the commodity placed on the scale dish 303 is different from the input number of pieces of the commodity. Since a case is also assumed in which a customer is not accustomed to the operation of the self-checkout terminal 101, it is preferable that the message to be notified has a content instructing a more detailed operation method as the number of times of the weight determination process increases.

In addition, the notification unit 603 may change notification contents and the notification method according to the combination of the magnitude of the weight difference and the number of times of the weight determination process. For example, if the number of times of the weight determination process is a predetermined number (for example, two times) in a state where the magnitude of the weight difference is the high level, the notification unit 603 may notify that it is waiting on the spot by display or sound, and make a notification to the attendant terminal 501. Further, for example, if the number of times of the weight determination processes is a predetermined number (for example, three times) in a state where the magnitude of the weight difference is the low level, the registration unit 602 may be controlled so as to register the commodity after notifying the attendant terminal 501 of the contents of the operation.

As described above, the self-checkout terminal 101 of the present embodiment switches notification contents and a notification method according to the actual conditions of the commodity of which the number is input, the actual condition of the customer repeating the weight determination process, and the like. Thus, the self-checkout terminal 101 can make a notification concerning the prevention of fraudulent acts and the operation support according to actual conditions, thereby improving the convenience of notification.

The adjustment processing unit 604 executes the adjustment process of the commodity indicated by the commodity information stored in the RAM 254, when accepting the accounting request of commodity by the accounting button 210d by the input receiving unit 601.

Figure 7:
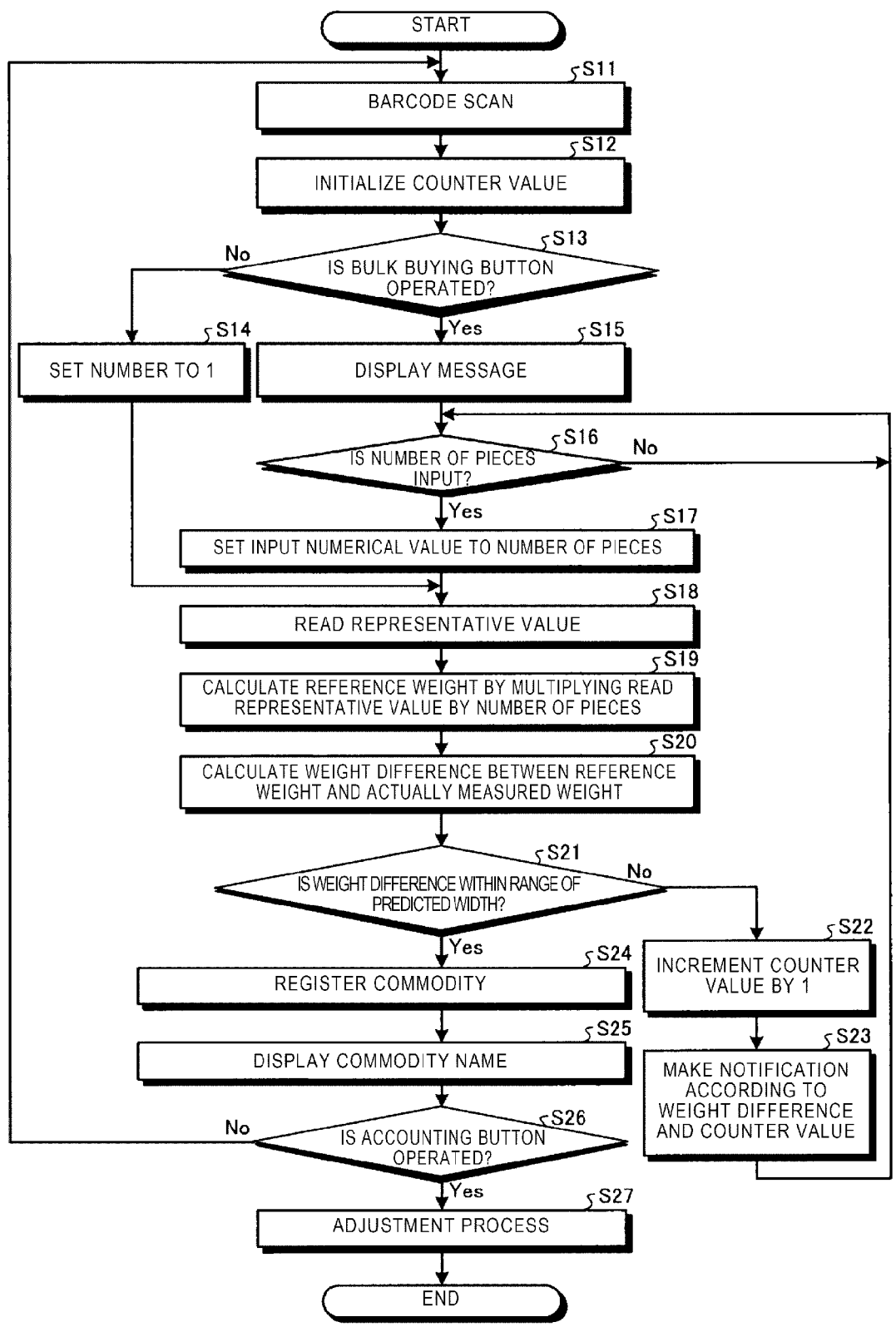
FIG. 7 is a flowchart illustrating an example of registration process executed by a self-checkout terminal.

Next, the operation of the self-checkout terminal 101 according to this embodiment will be described with reference to FIG. 7. FIG. 7 is a flowchart illustrating an example of registration process executed by the self-checkout terminal 101.

First, if barcode scan is performed by the barcode scanner 203 and commodity information is input (Act S11), the registration unit 602 initializes the counter value of the count counter that counts the number of executions of the weight determination process to zero (Act S12). Next, the input receiving unit 601 determines whether or not the bulk buying button 210a is operated (Act S13). If the bulk buying button 210a is not operated (No at Act S13), the registration unit 602 sets the number of pieces of the commodity to "1" (Act S14), and the process proceeds to Act S18.

If the bulk buying button 210a is operated (Yes at Act S13), the notification unit 603 displays on the LCD 210, a message prompting input of the number of pieces of the commodity indicated by input commodity information (Act S15). Next, the input receiving unit 601 waits for the input of the number of pieces of the commodity (No at Act S16). If the confirm button 210c is operated after a numerical value is input from the ten key 210b, the input receiving unit 601 accepts the numerical value input from the ten key 210b (Yes at Act S16). Next, the registration unit 602 sets the numerical value input in Act S15 to the number of pieces of the commodity (Act S17), and the process proceeds to Act S18.

Subsequently, the registration unit 602 reads the representative value associated with the commodity code indicated by the input commodity information from the commodity master file T (Act S18). Next, the registration unit 602 calculates the reference weight by multiplying the read representative value by the number of pieces of the commodity (Act S19). Next, the registration unit 602 calculates the weight difference which is the difference between the calculated reference weight and the actually measured weight of the commodity measured by the scale device 301 (Act S20). Then, the registration unit 602 executes a weight determination process for determining whether or not the weight difference calculated in Act S20 is within the range of the predicted width (Act S21).

In Act S21, if the weight difference is out of the range of the predicted width (No at Act S21), the registration unit 602 increments the counter value of the count counter by 1 (Act S22). Next, the notification unit 603 makes a notification according to the weight difference and the counter value (Act S23), and the process returns to Act S16.

On the other hand, if the weight difference is within the range of the predicted width in Act S21 (Yes at Act S20), the registration unit 602 executes a registration process of a commodity for storing the input commodity information in association with the number of pieces of the commodity, in the RAM 254 (Act S24). If the commodity is registered, the notification unit 603 displays on the LCD 210, the commodity name indicated by the registered (stored) commodity information (Act S25).

Subsequently, the input receiving unit 601 determines whether or not the accounting button 210d is operated (Act S26). When accepting the operation of the accounting button 210d (Yes at Act S26), the input receiving unit 601 executes an adjustment process of the commodity indicated by the commodity information stored in the RAM 254 (Act S27) and the ends the process. If the accounting button 210d is not operated (No at Act S26) and a new barcode is scanned (Act S11), the above-described process is repeated.

As described above, if the weight difference between the actually measured weight of a commodity and the reference weight calculated based on the representative value of the weight of the commodity is within the range of the predicted width, the self-checkout terminal 101 registers the commodity by assuming as a proper state in which commodities of the number entered by a customer are placed on the scale device 301. Thus, in the self-checkout terminal 101, even if a commodity has a variation in weight, it is possible to register the commodity as appropriate if the weight difference is within the range of the predicted width, such that the weight check can be performed more appropriately.

In addition, when determining that the weight difference is out of the range of the predicted width, the self-checkout terminal 101 makes a notification according to the magnitude of the weight difference and the number of executions of the weight determination process. Thus, the self-checkout terminal 101 can make a notification concerning the prevention of fraudulent acts and the operation support according to actual conditions, thereby improving the convenience of notification.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the above embodiment, an example in which the exemplary embodiment is applied to the self-checkout terminal 101 has been described, but the information processing apparatus to which the exemplary embodiment is applied is not limited thereto.

In the above embodiment, the configuration is such that the notification is made according to the magnitude of the weight difference and the number of times of the weight determination process. However, the configuration is not limited thereto, and it may be configured such that a notification is made according to one of the elements.

In the above embodiment, although the representative value of each commodity is set to a fixed value, the exemplary embodiment is not limited thereto, and the representative value may be updated dynamically. For example, on condition that the number of times of the weight determination processes is a predetermined number (for example, three times) at a state in which the magnitude of the weight difference is at the low level, the registration unit 602 may update the representative value, with the weight of one commodity measured by the scale device 301 as an element of the representative value calculation.

The program executed by the self-checkout terminal 101 of the above embodiment may be configured to be provided by being recorded in a computer-readable recording medium such as a floppy (registered trademark) disk, a Compact Disc (CD), a Compact Disc Recordable (CD-R), a Compact Disc Read Only Memory (CD-ROM), a Digital Versatile Disc (DVD), an SD memory card, a Universal Serial Bus memory (USB memory) as a file of an installable format or an executable format.

Further, the program executed by the self-checkout terminal 101 of the above embodiment may be configured to be provided by being stored in a computer connected to a network such as the Internet, and downloaded through a network.

Further, each functional unit of the self-checkout terminal 101 of the above embodiment can be realized by one or a plurality of processing circuits. Here, the processing circuit is a concept including hardware such as the above-mentioned processor (for example, the CPU 255), an Application Specific Integrated Circuit (ASIC) designed to realize each functional unit, and a circuit module.

What is claimed is:
1. An information processing apparatus comprising:
input means for inputting commodity information indicating a commodity to be registered;
setting means for setting the number of pieces of the commodity indicated by the commodity information;
measurement means for measuring weight of the number of pieces of the commodity indicated by the commodity information;
first determination means for determining whether or not a difference between the measured weight and a multiplication value obtained by multiplying a representative value of weight which is set in advance for the commodity indicated by the commodity information by the number is within a range of a preset predicted width;
registration means for registering the commodity indicated by the commodity information in association with the number, on condition that the first determination means determines that the difference is within the range of the predicted width;
second determination means for determining a threshold range to which the difference corresponds, based on a preset threshold range of a plurality of stages, on condition that the first determination means determines that the difference is out of the range of the predicted width; and
notification means for making different notifications for each of the threshold ranges, based on a determination result of the second determination means, wherein the different notifications comprise a first notification based on a first weight difference level, a second notification based on a second weight difference level, and a third notification based on a third weight differ- ence level, wherein the third notification comprises the second notification and an indication to an attendant terminal.

2. The apparatus according to claim 1, further comprising:
counting means for counting the number of times of determination for the same commodity executed by the first determination means,
wherein the notification means makes a notification according to the number of times of determination.

3. The apparatus according to claim 1,
wherein the first determination means determines whether or not the difference is within the range of the predicted width which is set in advance for the commodity indicated by the commodity information.

4. The apparatus according to claim 1,
wherein the representative value of the weight is any one of an average value, a median value and a mode of weight of the commodity indicated by the commodity information.

5. The apparatus according to claim 1, wherein the first notification comprises a request for re-entry of a quantity.

6. The apparatus according to claim 1, wherein the first notification is output based on a weight difference being less than a first threshold level, the second notification is output based on the weight difference being between the first threshold level and a second threshold level, and the third notification is output based on the weight difference being above the second threshold level.

7. The apparatus according to claim 1, wherein the notification means changes notification contents based on a number of times the weight determination is performed.

8. The apparatus according to claim 7, wherein the notification means performs the notification via a display based on the weight determination being performed one time.

9. The apparatus according to claim 7, wherein the notification means performs the notification as a voice-based notification based on the weight determination being performed one time.

10. The apparatus according to claim 7, wherein the notification means performs the notification via a display to a customer and to an attendant terminal based on the weight determination being performed two times.

11. The apparatus according to claim 7, wherein the notification means performs the notification as a voice-based notification to a customer and to an attendant terminal based on the weight determination being performed two times.

12. An information processing method comprising:
inputting commodity information indicating a commodity to be registered;
setting the number of pieces of the commodity indicated by the commodity information;
first determining whether or not a difference between weight of the number of pieces of the commodity indicated by the commodity information, measured by a weighing device and a multiplication value obtained by multiplying a representative value of weight which is set in advance for the commodity indicated by the commodity information by the number is within a range of a preset predicted width;
registering the commodity indicated by the commodity information in association with the number, on condition that in the first determining, it is determined that the difference is within the range of the predicted width;
second determining a threshold range to which the difference corresponds, based on a preset threshold range of a plurality of stages, on condition that in the first determining, it is determined that the difference is out of the range of the predicted width; and
making a different notification for each of the threshold ranges, based on a determination result in the second determining, comprising:
outputting a first notification based on a first weight difference level,
outputting a second notification based on a second weight difference level, and
outputting a third notification based on a third weight difference level, wherein the third notification comprises the second notification and an indication to an attendant terminal.

13. The method according to claim 12, wherein the outputting the first notification comprises outputting a request for re-entry of a quantity.

14. The method according to claim 12, wherein,
the outputting the first notification comprises outputting the first notification based on a weight difference being less than a first threshold level,
the outputting the second notification comprises outputting the second notification based on the weight difference being between the first threshold level and a second threshold level, and
the outputting the third notification comprises outputting the third notification based on the weight difference being above the second threshold level.

15. The method according to claim 12, further comprising changing notification contents based on a number of times the weight determination is performed.

16. The method according to claim 15, further comprising performing a notification via a display based on a determination that the weight determination is performed one time.

17. The method according to claim 15, further comprising performing a notification as a voice notification based on a determination that the weight determination is performed one time.

18. The method according to claim 15, further comprising performing a notification via a display to a customer and to an attendant terminal based on a determination that the weight determination is performed two times.

19. The method according to claim 15, further comprising performing a notification as a voice-based notification to a customer and to an attendant terminal based on a determination that the weight determination is performed two times.

* * * * *